United States Patent [19]

Winiasz

[11] 4,276,354
[45] Jun. 30, 1981

[54] STEAM TRAPS OR THE LIKE

[75] Inventor: Michael E. Winiasz, Lorain, Ohio

[73] Assignee: The Clark-Reliance Corporation, Cleveland, Ohio

[21] Appl. No.: 95,152

[22] Filed: Nov. 19, 1979

[51] Int. Cl.³ .............................................. F16T 1/00
[52] U.S. Cl. .................................. 428/582; 137/192; 137/202; 137/269; 236/99 R
[58] Field of Search ............... 137/202, 192, 185, 269; 251/366, 367; 428/577, 582; 236/99 R

[56] References Cited

U.S. PATENT DOCUMENTS

| | | | |
|---|---|---|---|
| 2,005,926 | 6/1935 | Armstrong | 137/185 |
| 3,147,920 | 9/1964 | McCormack | 137/190 X |
| 3,283,774 | 11/1966 | Johnson | 137/185 |

Primary Examiner—Alan Cohan
Attorney, Agent, or Firm—Yount & Tarolli

[57] ABSTRACT

The disclosure relates to a housing in which any one of a plurality of steam trap valve assemblies may be installed and which may be machined to accommodate a plurality of different inlet and outlet conduit configurations. The housing includes a main body through which a central cylindrical passage extends. Flanges extend radially outward from the main body at opposite ends of this passage and serve to connect the main body with the top and bottom members. The main body also includes a pair of additional passages which are parallel to the central cylindrical passage and a pair of bosses which extend radially outward. The top and bottom are made from identical castings and each comprises a circular portion adapted to mate with a flange on the main body and a boss extending diametrically from the perimeter of the flanges across at least past its center. The bosses on both the main body and the top and bottom may be machined to provide a plurality of different fluid flow paths and inlet and outlet connections. The bosses are drilled according to the particular valve assembly installed in the housing and the desired orientation of inlet and outlet connections. By using the disclosed valve housing for a number of different valve assemblies and inlet and outlet conduit configurations, the number of castings required and therefore production costs can be greatly reduced.

12 Claims, 11 Drawing Figures

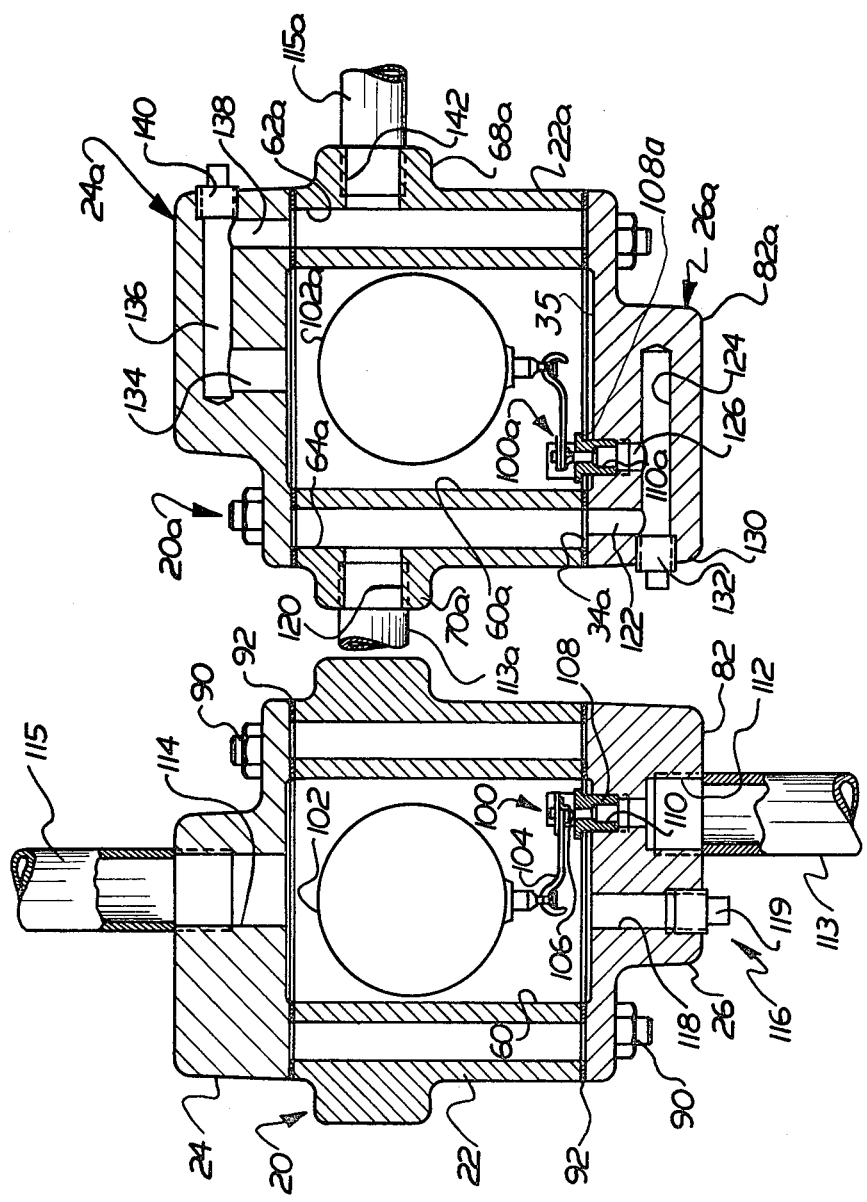

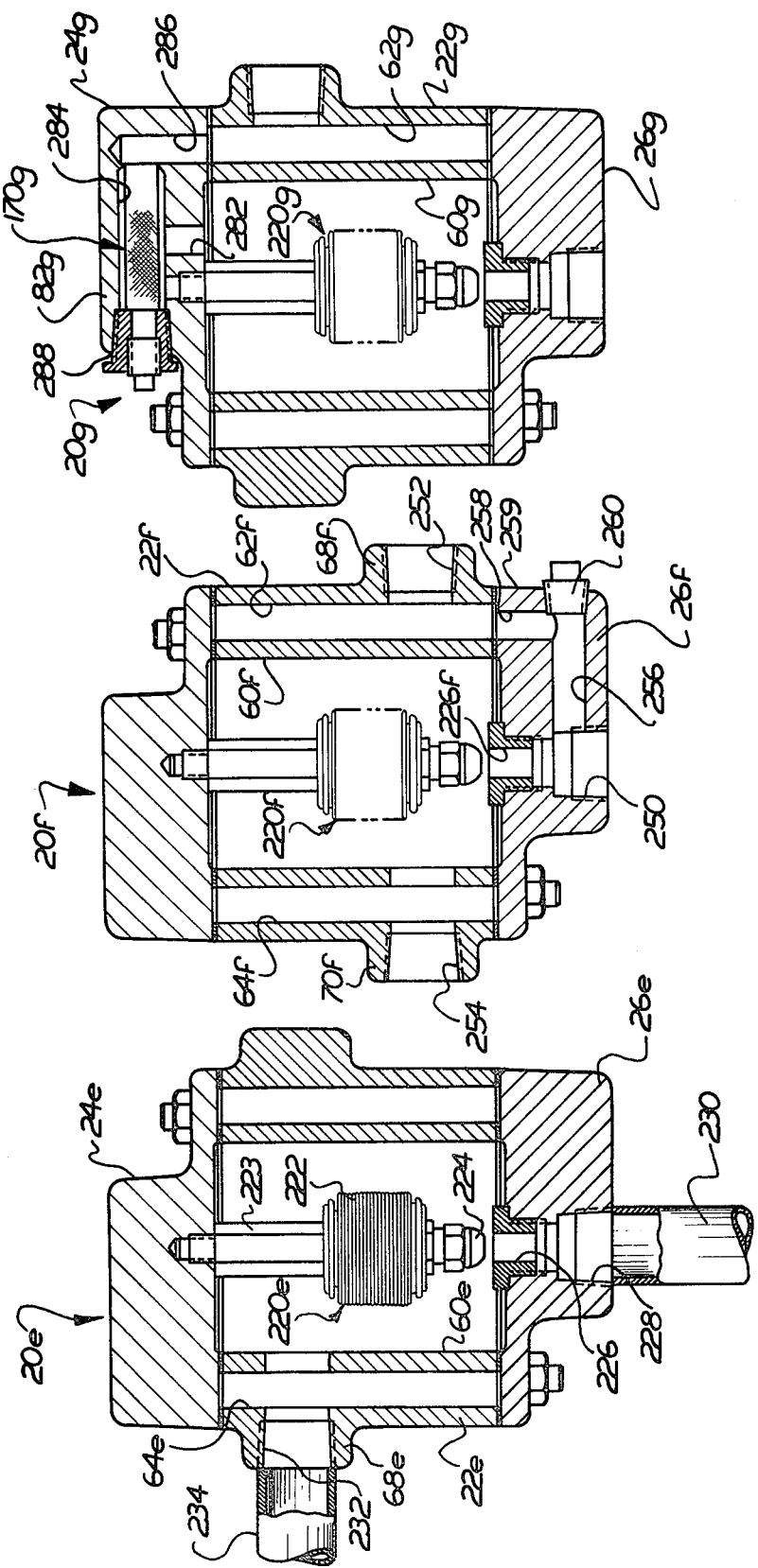

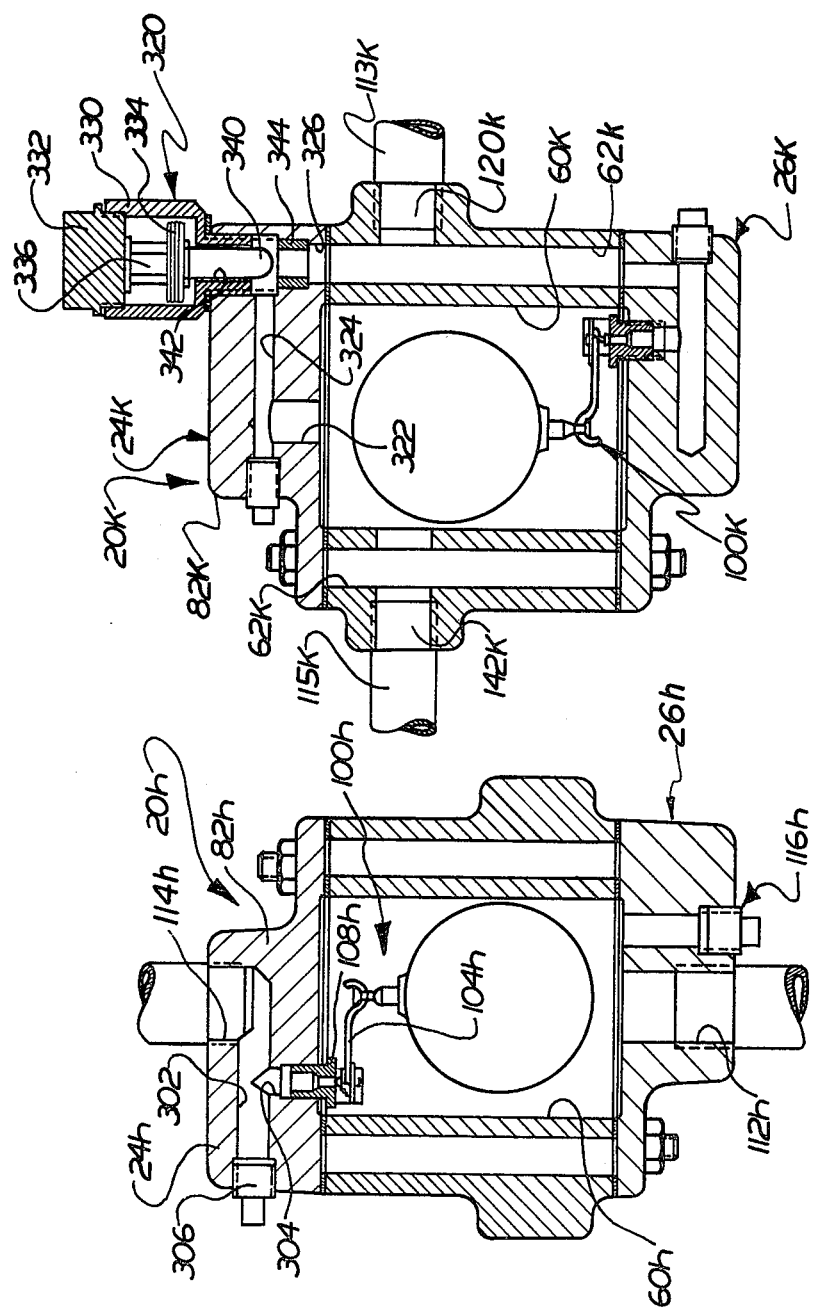

STEAM TRAPS OR THE LIKE

BACKGROUND OF THE INVENTION

The present invention relates to steam traps and in particular the invention relates to a steam trap housing adapted to receive a valve assembly. In particular the present invention relates to a housing which can receive any one of a plurality of different valve assemblies.

In the past, manufacturers of steam traps, float valves, and the like have produced a number of different valves, each of which is suited for a different application and function. Each of these valves is composed of a housing and a valve assembly. Because the valve assemblies differ from each other, different housings have been used for each valve assembly. Further, the same valve assembly may be housed in one or more different housings having differently positioned inlets and outlets to accommodate various configurations of inlet and outlet conduits. Where the housings have been cast, a different casting (or castings), and the dies to make them, have been required for each of the different valve assemblies and inlet and outlet arrangements.

SUMMARY OF THE INVENTION

The present invention comprises a steam trap housing which is adapted to receive any one of a plurality of different valve assemblies and which may be machined to accommodate any one of a plurality of inlet and outlet configurations. The housing is formed of two castings: a main body casting and an end casting which is used to form both a top and bottom to the main body of the housing. The same main body and end castings are used regardless of which one of a group of valve assemblies is to be fitted in the housing or how the inlet and outlet conduits are to be arranged. This greatly reduces the cost per housing over the prior technique of having a separate casting or castings for each different valve assembly or inlet and outlet arrangement.

The top and bottom castings are identical, and, as originally cast, they are solid, i.e., they have no internal passages or openings. The main body as cast includes three passages through it: a central passage or chamber in which an actuator, such as a float or bellows, of the valve assembly will eventually be disposed and a pair of additional passages parallel to the central passage. The top and bottom fit the main body casting and, when fastened in place, seal the ends of all three passages.

Additional passages may be machined into the top, the bottom and/or the main body castings to accommodate different arrangements of inlet and outlet conduits. The top, bottom and main body castings are provided with bosses which project from their exterior surfaces. These bosses may be drilled out to form passages according to the particular valve assembly to be installed in the housing and the particular arrangement of inlet and outlet conduits to be attached to the housing. The bosses on the top and bottom may be machined to form passages communicating between the central passage of the main body and one of the additional passages, or these bosses may be machined to provide threaded connections for an inlet or outlet conduit.

After casting, the top and/or the bottom is machined to receive a valve seat, and a filter to remove particulates may also be fitted in either the top or the bottom. Bosses projecting from the main body may be machined to connect an inlet or outlet conduit in communication with the central passage or with one of the additional passages in the main body. The particular drilling and machining performed on the top, bottom and main body castings depends on the particular valve assembly to be installed therein and the desired orientation of the inlet and outlet conduits.

BRIEF DESCRIPTION OF THE DRAWINGS

These and other essential features of the present invention will be apparent from the description below, and objects and advantages will be apparent to those skilled in the art to which the invention relates from the following description of a preferred embodiment of the present invention made with reference to the accompanying drawings in which:

FIG. 2 is a sectional view of a housing formed from the castings of FIG. 1 in which a float-type valve assembly has been fitted and in which the inlet and outlet conduits are connected with the bottom and top of the housing;

FIG. 3 is a sectional view of a housing formed from the castings of FIG. 1 in which a float-type valve assembly has been fitted and in which the main body has been machined to fit inlet and outlet conduits;

FIG. 7 is a sectional view of a housing formed from the castings of FIG. 1 which has been fitted with a thermostatic bellows-type valve assembly and in which the main body and the bottom have been machined to fit the inlet and outlet conduits;

FIG. 8 is a sectional view of a housing formed from the castings of FIG. 1 which has been fitted with a thermostatic bellows-type valve assembly and in which the main body and the bottom have been machined to fit inlet and outlet conduits;

FIG. 9 is a sectional view of a housing formed from the castings of FIG. 1 which has been fitted with a thermostatic bellows-type valve assembly, in which the top has been fitted with a particulate filter and in which the main body and bottom have been machined to receive inlet and outlet conduits;

FIG. 10 is a sectional view of a housing formed from the castings of FIG. 1 which has been fitted with a float type valve assembly in which connections for inlet and outlet conduits are in vertical alignment with each other; and FIG. 11 is a sectional view of a housing formed from the castings of FIG. 1 which has been fitted with a float type valve assembly and with a thermostatic valve assembly.

DESCRIPTION OF ONE PREFERRED EMBODIMENT OF THE INVENTION

The present invention relates to a steam trap housing. As a result of the present invention any one of a plurality of different steam trap valve assemblies may be fit into a single housing by machining the housing appropriately. Further, the housing may be machined to accommodate a variety of different orientations of inlet and outlet conduits. While the invention is described as applied to a housing for a steam trap, it could be used on any other type of valve.

Figure 1:
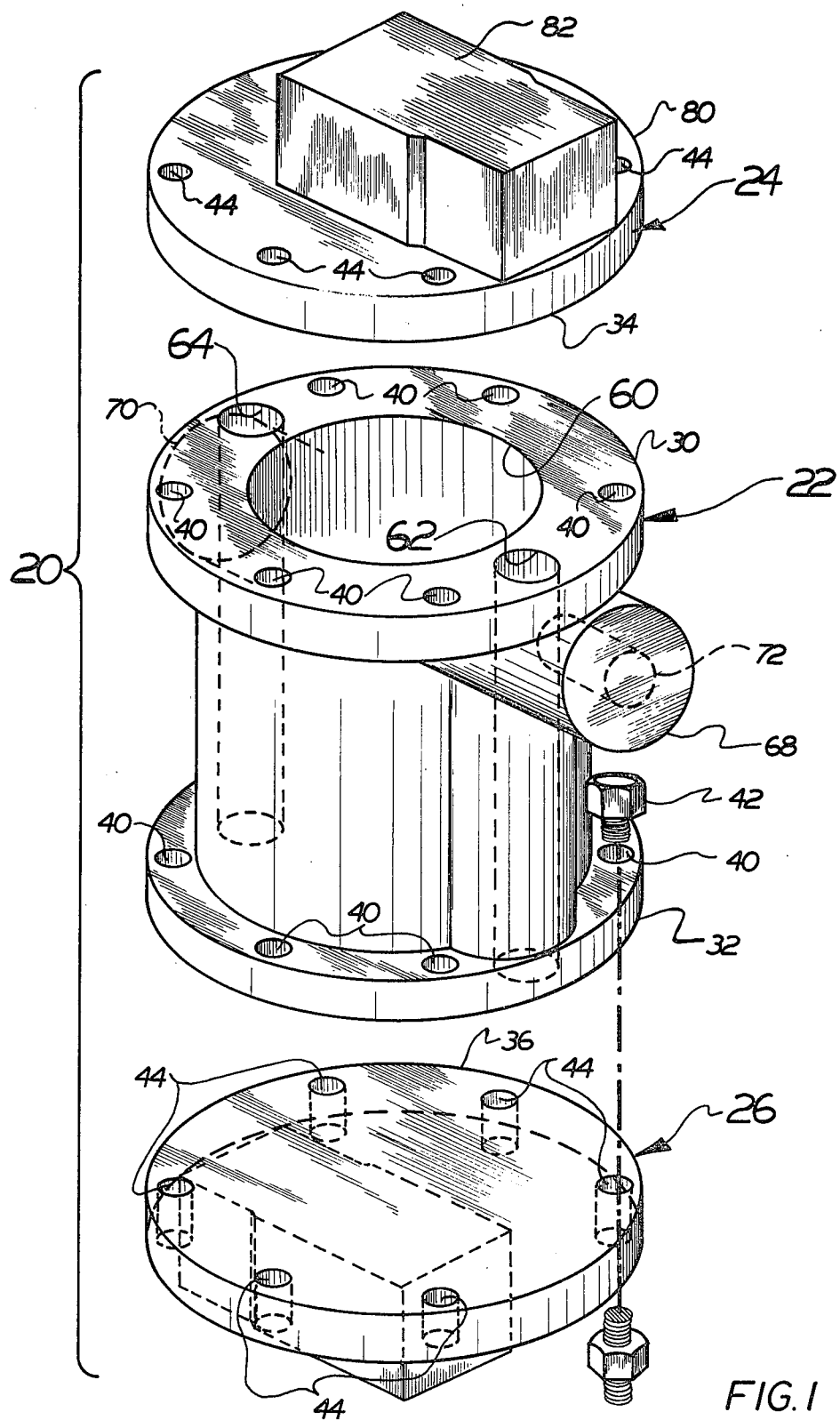
FIG. 1 is a perspective illustration of a main body casting and a pair of end castings formed according to the present invention.

FIG. 1 illustrates members suitable to form a housing 20 constructed in accordance with the present invention. The housing 20 comprises a main body 22, a top 24 and a bottom 26. The main body 22 is generally cylindrical and has a pair of circular flanges 30 and 32 extending radially outward at opposite ends thereof. The top 24 and the bottom 26 have circular surfaces 34 and 36, respectively, which sealingly engage the flanges 30 and 32. The flanges 30 and 32 are each provided with six evenly spaced holes 40 through which bolts 42 (only one shown) may be inserted to fasten the top 24 and bottom 26 to the main body 22. The top 24 and bottom 26 are each provided with six holes 44 disposed radially inward from the periphery of the top and bottom and which align with the holes 40 in the main body 22 through which the bolts 22 extend to hold the housing (20) together.

The main body 22 and the top and bottom 24 and 26 are formed of metal, and may be manufactured by any known fabricating technique. However, it is preferred that these members be made by casting, and consequently, they are preferably formed of a metal which is easily cast such as cast iron.

The main body 22 is cast with a central cylindrical passage 60 extending between the flanges 30 and 32. Two additional passages 62 and 64 extend parallel to the central passage 60 and are located on diametrically opposite sides of the central passage. The additional passages 62 and 64 also extend between the flanges 30 and 32. When the top 24 and bottom 26 are in place, the ends of all three passages 60, 62 and 64 through the main body 22 are covered by the top and bottom.

The main body 22 is also provided with a pair of diametrically opposed bosses 68 and 70. The bosses 68 and 70 are generally cylindrical and are coaxial with each other. The common axis of the bosses 68 and 70 intersects the additional passages 62 and 64 so that a passage 72 may be machined in the boss 68 to intersect the additional passage 62. Likewise a similar passage could be machined in the boss 70 which intersects the additional passage 64. Further, the passage 72 could be extended until it reached the central passage 60 through the main body 22. These passages may be formed using any suitable machine tool, such as a drill press, lathe, etc. The purposes for which these passages are formed will become apparent below.

As mentioned above, the top 24 and the bottom 26 are formed from identical castings. Consequently, only the top 24 will be described in detail, however, it will be understood that the description of the top 24 applies equally to the bottom 26.

The top 24 has a generally circular base portion 80 and a boss 82 extending diametrically across the base portion 80 opposite from the side 34 which mates with flange 30 of the main body portion 32. The boss 82 is positioned relative to the holes 44 so that when the top 24 is connected with the main body 22, the boss 82 may be aligned with one or the other of the additional passages 62 or 64 in the main body. The boss 82 is proportioned so that passages connecting the central passage 60 of the main body 22 with the additional passage 62 may be formed in it. Also passages which connect either of the passages 60, 62 or 64 with an inlet or outlet conduit may be formed in the boss 82. In addition, a passage may be formed in the boss 82 to house a filter for removal of particulate material from a fluid flowing through the housing 20. Except for the central passage 60 and the additional passages 62 and 64 in the main body 22, all fluid-conducting passages to be formed in the top 24, bottom 26, or main body 22 are machined into these members after casting and as a part of the process of installing a valve assembly in the housing 20.

The housing 20 may receive any one of a number of different valve assemblies. FIGS. 2-11 illustrate different steam trap valve assemblies installed in the housing 20 and illustrate some of the different combinations of passages which may be formed in the main body 22, the top 24 and/or the bottom 26 by selectively removing material from these members in accordance with the particular valve assembly installed therein and the desired arrangement of inlet and outlet conduits. These different configurations of passages enable the two castings from which the main body 22 and the top 24 and bottom 26 are formed to provide a wide variety of arrangements for inlet and outlet passages for any particular type of valve assembly. The wide variety of configurations of passages which can be formed also enables the housing 20 to accommodate a number of different types of valve assemblies.

FIG. 2 illustrates a housing 20 formed of a main body 22, a top 24 and bottom 26 which have been fastened together by suitable threaded fasteners 90. Gaskets 92 have been provided between the top 24, main body 22 and bottom 26 to provide a fluid tight seal. The housing 20 has been fitted with a float-type steam trap valve assembly 100. The valve assembly 100 comprises a float 102 which is pivotally connected with an arm 104 to which a valve member 106 is connected. The valve member 106 cooperates with a valve seat 108 which is fastened by any suitable means to the bottom 26 of the housing 20.

A passage 112 has been drilled in the boss 82 on the bottom 26. The passage 112 communicates at one end with the valve seat 108 and its opposite end is threaded to receive an outlet conduit 113. A passage 114 has been drilled through the boss 82 on the top 24 and has been threaded to receive an inlet conduit 115. When the valve assembly 100 is opened, fluid flows from inlet conduit 115 through the passage 114 and into the central passage 60 where the float 102 is located. Thereafter fluid flows through the passage 110, through the valve seat 108, and outlet passage 112 to the outlet conduit 113. This fluid may be discharged to the atmosphere or any suitable reservoir. It should be noted that the passage 114 is coaxial with the central passage 60 through the main body 22 and that the passage 112 in the bottom 26 is parallel to the passage 114. This arrangement of inlet and outlet passages 114 and 112 is convenient when the inlet and outlet conduits are vertical. The bottom 26 is also provided with a sediment clean out 116. The clean out 116 includes a hole 118 formed through the bottom 26 and communicating with the central chamber 60. The hole 118 is sealed with a plug 119 which is removable to clean the passage 118 of accumulated deposits.

FIG. 3 illustrates a valve housing 20a and a steam trap valve assembly 100a generally similar to those illustrated in FIG. 2. In FIG. 3 those parts which are similar to parts shown in FIGS. 1 and 2 are labelled with the same reference numerals to which the suffix "a" has been added for purposes of clarity. In the embodiment illustrated in FIG. 3, the housing 20a has been machined to accommodate inlet and outlet conduits which are horizontal. To this end, the boss 70a of the main body 22a has been drilled to form a passage 120 which intersects the additional passage 64a. The passage 120 has been threaded to receive an outlet conduit 113a.

Three passages 122, 124 and 126 (FIG. 3) have been formed in the bottom 26a to interconnect the passage 64a with the passage 110a through the valve seat 108a. The passage 122 extends downward perpendicular to the surface 34a of the bottom 26a and is aligned with the additional passage 64a in the main body 22a. The passage 124 is perpendicular to and intersects the passage 122. Passage 124 is drilled from the end face 130 of the boss 82a, and subsequently the opening in the face 130 is plugged with a plug 132 which may be fastened in place by any suitable means.

The passage 126 interconnects the central passage 60a in the main body with the passage 124 in the bottom 26a. It is positioned on the surface 35 of the bottom 26a to accommodate the valve assembly 100a within the central passage 60a. The valve seat 108a may be threaded into the passage 126, or it may be fastened in any suitable way which permits fluid flow from the central passage 110a through the valve seat 108a to the passage 126 formed in the bottom 26a. Because the valve assembly 100a requires an offset the length of the arm 104 between the float 102a and the valve seat 108a, the passage 126 is offset from the central axis of the central passage 60a.

The passages 122, 124 and 126 and the plug 132 thus cooperate to define a U-shaped path which interconnects the additional passage 64a with the central passage or chamber 60a in the main body 22a of the housing 20a. Three similar passages 134, 136 and 138 form a comparable interconnection between the central passage 60a of the main body 22a and the additional passage 62a. The passage 134 interconnects the central passage 60a of the main body 22a and transverse passage 136 in the top 24a. The passage 134 is coaxial with the central passage 60a. The transverse passage 136 extends generally parallel to the passage 124. The passage 138 is generally parallel to the passage 134 and interconnects transverse passage 136 with the additional passage 62a in the main body 22a. Again, a plug 140 is used to seal the end of the passage 136. The boss 68a on the main body 22a is drilled to form a passage 142 which intersects the additional passage 62a and is threaded to accommodate inlet conduit 115a. Thus, when the valve 100a (FIG. 3) is open, fluid flows from passage 142 through passage 62a and the three passages 134, 136 and 138 in the top 24a and into the central passage or chamber 60a. From the central chamber 60a, fluid flows through the valve seat 108, through passages 126, 124 and 122 in the bottom 26a and into the additional passage 64a in the main body 22a and leaves through outlet passage 120.

Figure 4:
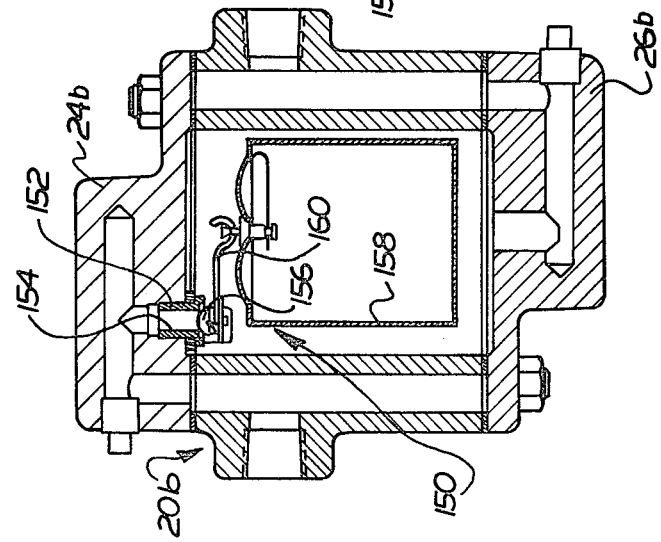
FIG. 4 is a sectional view of a housing formed from the castings of FIG. 1 which has been fitted with an inverted bucket-type steam trap valve assembly and in which the main body of the housing has been machined to receive inlet and outlet conduits.

FIG. 4 illustrates a housing 20b which is equipped with an inverted bucket-type steam trap valve assembly 150. The parts of the embodiment illustrated in FIG. 4 which correspond to similar parts in the other Figures are given similar reference numerals with the suffix "b" appended.

The steam trap valve mechanism 150 illustrated in FIG. 4 is a conventional inverted bucket-type steam trap. The valve assembly 150 comprises a valve seat 152 having a central passage 154 through which fluid may flow when the valve assembly 150 is open. A valve member 156 is moved into and out of sealing engagement with the valve seat 152 when the inverted bucket 158 rises and falls. The inverted bucket 158 is connected with the valve member 156 by arm 160. The mode of operation of the valve assembly 150 is well known to those skilled in the art and comprises no part of the present invention.

A comparison of FIGS. 3 and 4 reveals the substantial similarity between the housing 20a illustrated in FIG. 3 and the housing 20b illustrated in FIG. 4. In particular, the top 24b shown in FIG. 4 is substantially the same as the bottom 26a shown in FIG. 3. Likewise, the bottom 26b shown in FIG. 4 is substantially the same as the top 24a of FIG. 3. It is clear that the housing 20b for the steam trap illustrated in FIG. 4 is made of the same components as the housing 20a for the valve shown in FIG. 3. The difference between these two is that the top and bottom have been reversed and an inverted bucket valve assembly 150 has replaced the float-type valve assembly 100a shown in FIG. 3. Thus, the same castings shown in FIG. 1 machined in the same way may be used with the float valve assembly 100 of FIG. 3 and the inverted bucket valve assembly 150 of FIG. 4.

Figure 5:
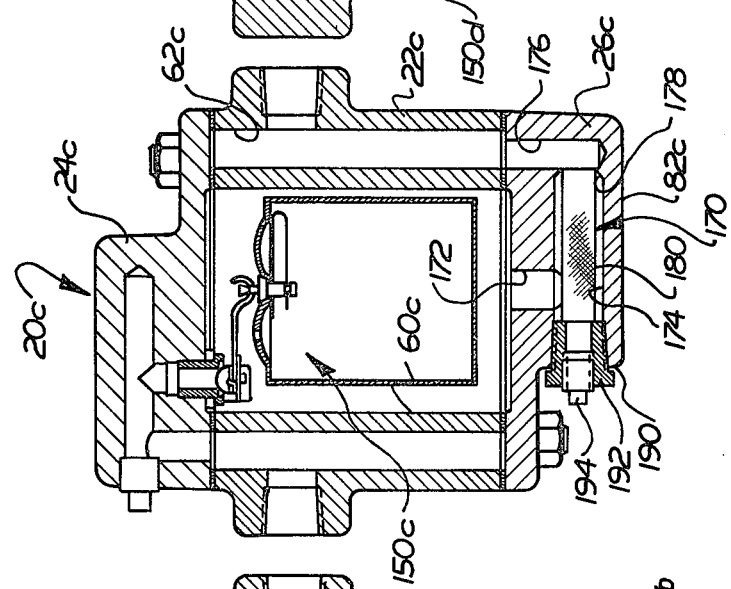
FIG. 5 is a sectional view of a housing formed from the castings of FIG. 1 which has been fitted with an inverted bucket steam trap valve assembly and in which the bottom member has been drilled to receive a filter and the main body member has been machined to receive inlet and outlet conduits.

FIG. 5 illustrates another embodiment of the housing 20c, and it is similar to the embodiment shown in FIG. 4. In FIG. 5 those elements which correspond to identical elements in other Figures have been given similar numerals with the suffix "c" appended. Thus, the housing 20c of FIG. 5 comprises a top 24c, a main body 22c, and a bottom 26c. The top 24c is identical to the top 24b shown in FIG. 4, as are the main body 22c and the inverted bucket valve assembly 150c.

The difference between the embodiment illustrated in FIG. 4 and that shown in FIG. 5 resides in the filter assembly 170 of FIG. 5 which has been fitted in the bottom 26c. The bottom 26c includes a passage 172 which is coaxial with the central passage 60c of the main body 22c and interconnects it with a transverse passage 174. A third passage 176 interconnects the passage 174 with the additional passage 62c in the main body 22c.

The filter 170 is disposed within the passage 174 and is arranged so that all fluid flowing between passages 176 and 172 must flow through the filter. This is achieved by making the passage 174 larger in diameter than the passage 176 which intersects it. This forms a frustoconical end surface 178 which surrounds the intersection of passages 174 and 176. The filter element 180 is a hollow cylindrical fine mesh screen, and one end of it sealingly engages the end surface 178 of the passage 174. In this way all fluid flowing between passages 176 and 172 must pass through the screen.

The passage 174 is drilled from end face 190 of the boss 82c of the bottom 22c. A reducing bushing 192 is threaded into the open end of the passage 174 and abuts the end of the filter 180 which is opposite from the end face 178 of the passage 174. The reducing bushing 192 thus holds the filter element 180 in place. A plug 194 is threaded into a central passage through the reducing bushing 192.

Because flow through the filter assembly 170 is from passage 176 toward passage 172, particulates filtered from the flow accumulate within the cylindrical filter element 180. Removal of the plug 194 which is received in a central passage through the reducing bushing 192 makes it possible to flush the particulates out of the filter 180. In situations where flushing of the filter element 180 is required frequently the plug 194 may be replaced with a manually operable valve (not shown).

Figure 6:
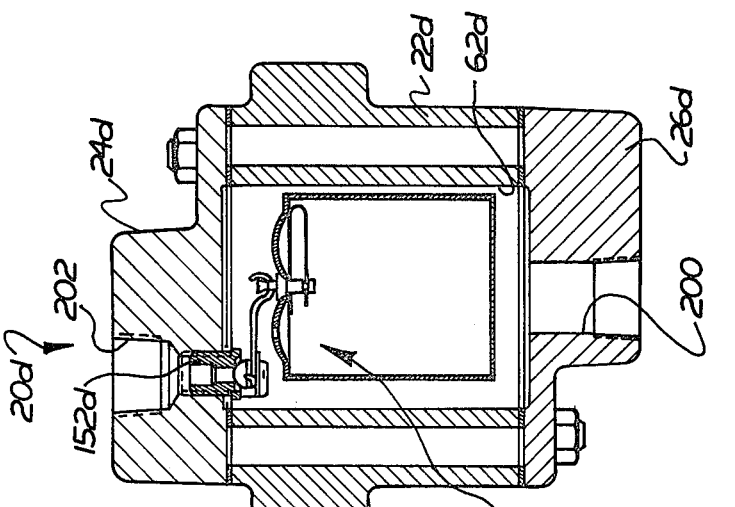
FIG. 6 is a sectional view of a housing formed from the castings of FIG. 1 which has been fitted with an inverted bucket-type steam trap valve assembly and in which the top and bottom have been machined to receive inlet and outlet conduits.

FIG. 6 illustrates another configuration 20d of the housing constructed according to the present invention. In FIG. 6, elements which correspond to similar elements in the other Figures have been given the same reference numeral with the letter "d" appended thereto.

In FIG. 6 is illustrated a valve housing 20d which is equipped with an inverted bucket-type steam trap valve assembly 150d and which is suited for applications where the inlet and outlet pipes are vertical. A comparison of FIGS. 2 and 6 shows that the housing 20 of FIG. 2 is the same as that (20d) of FIG. 6, except that the top and bottom have been reversed.

FIGS. 7, 8 and 9 illustrate housings 20e, 20f and 20g, respectively, in which bellows-type steam trap valve assemblies 220e, 220f and 220g, respectively, have been installed. Since these valve assemblies are substantially the same, only the valve assembly 220e will be described, but it will be understood that the description applies equally well to the other bellows-type valve assemblies.

The bellows-type valve assembly 220e is well known to those skilled in the art and comprises a flexible metallic bellows 222, one end of which is fixedly connected with the top 24e, preferably by means of a threaded rod 223 which is received in a cooperating threaded hole in the top 24e. A valve member 224 is fixedly connected with the opposite end of the bellows 222 and cooperates with the valve seat 226 which is threaded into a passage 228 in the bottom 26e of the housing 20e. When the temperature within the central passage 60e of the main body 22e exceeds a predetermined level, the fluid within the bellows 222 expands forcing the valve member 224 into sealing engagement with the valve seat 226.

The housing 20e is adapted to receive inlet and outlet conduits which are perpendicular to each other. To this end, a passage 228 is formed in the bottom 26e of the housing 20e coaxial with the central passage 60e. In addition, the end of the passage 228 which is remote from the central chamber 60e is threaded to receive an outlet conduit 230. A passage 232 has been machined in the boss 68e and this passage is perpendicular to the passage 228. The passage 232 extends through the boss 68e and the additional passage 64e into the central passage 60e of the main body 22e. In this way when the valve assembly 222 is opened, fluid may flow from the inlet conduit 234 through passage 232 and into the central passage 60e, and from there fluid may flow through the valve seat 226 and out passage 238 to an outlet conduit 230 which is threaded into the passage 228.

FIG. 8 illustrates a housing 20f constructed according to the present invention. Those parts shown in FIG. 8 which correspond to similar parts in the preceding Figures are given similar numerals with the suffix "f" added. The housing 20f is equipped with a bellows-type valve assembly 220f and is provided with a pair of outlet passages 250 and 252 which are perpendicular to each other and a single inlet passage 254 which is coaxial with outlet passage 252.

In order to provide fluid communication between the outlet passage 252 (which extends through boss 68f into the additional passage 62f in the main body 22f) and the central passage 60f in the main body 22f, the bottom 26f is provided with three interconnecting passages 250, 256 and 258. The passage 250 is coaxial with the central axis of the central passage 60f in the main body and passes completely through the bottom 26f. The passage 256 intersects passage 250 and is perpendicular thereto. The passage 256 is drilled from the radially outer end face 259 until it intersects with the passage 250. The open end of the passage 256 is sealed with a plug 260. The passage 258 is drilled perpendicular to the passage 256, and it interconnects the passage 256 with the passage 62f in the main body 22f. In this way fluid can flow from the inlet 254 into the central passage 60f, and through the valve seat 226f. The two outlet passages 250 and 252 are provided for convenience, whereby one or the other may be utilized. The one not in use may be blocked by any suitable plug.

FIG. 9 illustrates a valve housing 20g constructed in accordance with the present invention and fitted with a bellows-type valve assembly 220g. The valve housing 20g is constructed from the same castings 22, 24 and 26 illustrated in FIG. 1. The valve housing 20g shown in FIG. 9 is adapted to be used where the inlet and outlet conduits are perpendicular to each other, one being vertical and the other being horizontal. In addition, the housing 20g contains a filter assembly 170g for removing particulate matters from the fluid flowing between the inlet and outlet conduits.

The bottom 26g is identical with the bottom 26e shown in FIG. 7, and consequently no further description of this member is required. The top 24g is generally similar to the bottom 26c shown in FIG. 5. Thus, the top 24g (FIG. 9) includes three passages 282, 284 and 286 which interconnect the central passage 60g of the main body 22g with the additional passage 62g. The passage 282 is parallel to the central axis of the central passage 60g through the main body 22g and interconnects the central passage 60g with passage 284 which is perpendicular to passage 282. The passage 284 is perpendicular to the central axis of the central passage 60g through the main body 22g and extends radially through the boss 82g from face 288 until it intersects passage 286. Passage 286 is perpendicular to passage 284 and aligned with the additional passage 62g in the main body 22g. The filter assembly 170g is similar to the filter assembly 170 shown in FIG. 5 both in its mode of operation and in the manner of installing it, and therefore further description is not required.

FIG. 10 illustrates a valve housing 20h constructed in accordance with the present invention. Those parts illustrated in FIG. 10 which correspond with similar parts in other Figures have been given similar reference numerals with the suffix "h" appended.

The assembly 20h illustrated in FIG. 10 includes a valve assembly 100h which is the same float valve assembly illustrated in FIGS. 2 and 3, but installed "upside down". When installed in this way, the assembly acts as a vent trap with fluid flowing in through passage 112h and out through passage 114h. When the incoming fluid is a gas and the central passage 60h is not filled with condensate, the valve assembly 100h is open and the incoming fluid escapes through the outlet passage 114. When the incoming fluid is liquid, the valve assembly 100h closes.

The bottom 26h of the housing 20h is identical to the top 24 illustrated in FIG. 2 except that a sediment clean out 116h has been provided. The bottom 26h includes an inlet passage 112h which is coaxial with the central chamber 60h. The outlet passage 114h is also coaxial with the central chamber 60h. Thus, the assembly 20h of FIG. 10 is suited for applications where the inlet and outlet conduits are vertical and aligned with each other.

The top 24h includes two passages 302 and 304 which accommodate the offset of the arm 104h of the valve assembly 100h. The passage 304 extends parallel to the axis of the outlet passage 114h and receives the valve seat 108h. The passage 302 is drilled radially in the boss 82h and intersects passages 114h and 304. A plug 306 seats in one end of the passage. In this way fluid communication is established between the outlet 300 which is coaxial with the inlet 112h and the valve seat 108h which is offset from the center line of the central chamber 60h.

It should be clear that an end similar to the top 24h may be used in place of the top 24d shown in FIG. 6 to adapt that embodiment to inline vertical inlet and outlet conduits. Similarly, an end like the top 24h could be used in place of the bottom 26 shown in FIG. 2 to adapt the embodiment of FIG. 2 to coaxial vertical inlet and outlet conduits. Likewise a similar top could be fashioned for the bellows actuated embodiments illustrated in FIGS. 7–9 to adapt them to vertical inline inlet and outlet conduits.

FIG. 11 illustrates a housing 20k which has been provided with a float type valve assembly 100k and with a thermostatic valve assembly 320. Those parts shown in FIG. 11 which correspond to similar parts in the preceding Figures have been given similar reference numerals with the suffix "k" appended.

The trap illustrated in FIG. 11 is effective to purge both gasses and condensate from a system during start up. When a system utilizing steam has been shut off, the rest of the system may generate gasses such as carbon dioxide and air which then accumulate in the central chamber 60k of the trap. In addition, consensate may also accumulate in the trap. When the steam flow is restarted, it forces the gasses and condensate out of the trap.

Two exit paths are provided, one for the gasses which collect in the top of the central chamber 60k and one for the liquid condensate which accumulates in the bottom. Steam flows in through passage 142k which provides fluid communication between the inlet conduit 115k and the central chamber 60k. If condensate is present in sufficient quantity to open the valve assembly 100k, the liquid condensate is forced out through the bottom 26k to the auxiliary passage 62k and outlet 120k to the outlet conduit 113k. The bottom 26k is identical to the bottom 26a illustrated in FIG. 3.

Fluid communication between the top of the central chamber 60k and the outlet conduit is controlled by the thermostatic bellows valve assembly 320. When relatively cool gasses which accumulate during a shut down period are present in the chamber 60k, the valve assembly 320 is open, and incoming steam displaces the gasses which are forced out past the thermostatic valve assembly 320. Once steam heats the valve assembly 320, fluid communication between the top of the chamber 60k and the outlet conduit 113k is shut off by the valve assembly 320.

The top 24k includes a passage 322 coaxial with the central axis of the chamber 62k and extending part way through the boss 82,. A transverse passage 324 extends radially in from one edge of the boss 82k and connects passge 322 with a third passage 326. The passage 326 is parallel with passage 322, and it communicates with the auxiliary passage 62k.

The valve assembly 320 includes a bellows housing 330 which is threaded into the upper end of the passage 326. The bellows housing 330 has a top 332 threaded thereto. The thermostatic bellows 334 is connected with the top 332 by means of a hexagonal shaft 336 which has a threaded end portion screwed into the top and its opposite end connected with the bellows 334.

A valve member 340 is connected to the opposite end of the bellows 334, and it extends through passage 342 in the bellows housing 334. There is clearance between the valve member 340 and the walls of the passage 342 so that steam may pass by the valve member to heat the bellows 334. When the bellows 334 expands, the valve member 340 engages the valve seat 344 to cut off the flow of gasses from the chamber 60k through passages 322, 324, 326, 62k and 142k to the outlet conduit 113k. The valve seat 344 is threaded into the passage 326 between the intersection of passages 326 and 324 and the connection between passage 326 and auxiliary passage 62k. Once steam has reached the valve assembly 320 and caused the valve member 340 to seat against the valve seat 344, the trap illustrated in FIG. 11 operates just like the float trap illustrated in FIG. 3.

Thus, it should be clear that the castings which form the housing 20 (FIG. 1) may be readily adapted to receive a number of different valve assemblies such as valve assemblies 100 (FIG. 2), 150 (FIG. 4) and 220e (FIG. 7). Furthermore, the housing may be easily adapted to receive a filter assembly 170 (FIG. 5) for removing particulate matter from fluid flowing through the housing 20–20g, and the housing can accommodate a number of different orientations of inlet and outlet conduits. The great flexibility of the housing 20 (FIG. 1) in accommodating these different structures permits only two castings (one for the main body 22 and one for the top and bottom 24 and 26) to be used where in the past a much larger number have been required. Finally, it should be noted that the arrangements of passages, filters, and valve assemblies illustrated in FIGS. 2–9 are only illustrative of many possible combinations, and those shown are not to be construed as limiting the scope of the present invention.

The following is claimed:

1. A housing adapted to receive any chosen one of a plurality of different valve assemblies for controlling fluid flow from an inlet conduit through said housing to an outlet conduit, said housing comprising top and bottom members and a main body with walls defining a central passage extending between said top and bottom members, said top and bottom members being fastened to said main body and sealing the ends of said central passage, said main body including walls defining at least one additional internal passage extending between said top and bottom members, said top and bottom members being identical and having portions selectively removable in accordance with the one of the plurality of different valve assemblies chosen to be received in said housing to establish fluid communication between said additional passage and said central passage in said main body, said main body and said top and bottom members each having wall portions selectively removable to provide means for connecting the inlet and outlet conduits to said housing.

2. A housing as set forth in claim 1 wherein said main body includes first and second additional passages extending between said top and said bottom members.

3. A housing as set forth in claim 2 wherein said additional passages are symmetrically disposed about the central axis of said central passage through said main body.

4. A housing as set forth in claim 2 wherein said main body portion includes parallel opposite flat end faces, said central passage defines an opening in each of said end faces, said additional passages define openings in each of said end faces, and said top and bottom members each have flat faces adapted to sealingly engage said end faces of said main body.

5. A housing as set forth in claim 4 wherein said main body includes a pair of circular flanges extending radially outward at opposite ends of said main body and which at least partially define said end faces of said main body, said top and bottom members each comprise a first surface defined by a circular flange and adapted to mate with said circular flanges on said main body, and a boss projecting from a surface opposite said first surface and extending diametrically from the perimeter of said circular flange on said member.

6. A housing as set forth in claim 5 wherein material may be selectively removed from said boss to form a first passage communicating with said central passage and a second passage aligned with one of said first or second additional passages in said main body.

7. A housing as set forth in claim 6 wherein material may be selectively removed from said boss to form a third passage interconnecting said first and second passages formed in said boss.

8. A housing as set forth in claim 1 wherein said wall portions selectively removable to provide means for connecting the inlet and outlet conduits to said housing comprise bosses projecting from the exterior of said top and bottom members and said main body.

9. A housing adapted to receive any chosen one of a plurality of different valve assemblies for controlling fluid flow from an inlet conduit through said housing to an outlet conduit, said housing comprising top and bottom members and a main body with walls defining a central passage extending between said top and bottom members and walls defining first and second additional passages symmetrically disposed about the central axis of said central passage through said main body and extending between said top and bottom members, said main body including a pair of circular flanges extending radially outward at opposite ends of said main body, said flanges including parallel opposite flat end faces, said central passage and said additional passages defining openings in each of said end faces of said main body, said top and bottom members being identical, each having a flat face defined by a circular flange adapted to sealingly engage said end faces of said main body, a boss projecting from a surface opposite said flat face of each of said top and bottom members and extending diametrically from the perimeter of said circular flange on each of said members, and portions selectively removable in accordance with the one of a plurality of different valve assemblies chosen to be received in said housing to establish fluid communication between one of said additional passages and said central passage in said main body, said main body and said top and bottom members each having wall portions selectively removable to provide means for connecting the inlet and outlet conduits to said housing.

10. A housing as set forth in claim 9 wherein material may be selectively removed from one of said bosses to form a first passage communicating with said central passage and a second passage aligned with one of said first or second additional passages in said main body.

11. A housing as set forth in claim 10 wherein material may be selectively removed from said boss to form a third passage interconnecting said first and second passages formed in said boss.

12. A housing as set forth in claim 9 wherein said wall portions selectively removable to provide means for connecting the inlet and outlet conduits to said housing comprise said bosses projecting from said top and bottom members and bosses projecting from the exterior of said main body.

* * * * *